United States Patent
Buhl

(10) Patent No.: US 9,261,127 B2
(45) Date of Patent: Feb. 16, 2016

(54) FASTENER WITH MULTILOBULAR TOOL ENGAGING PORTION

(71) Applicant: ITW CONSTRUCTION PRODUCTS APS, Middelfart (DK)

(72) Inventor: Morten Irming Friis Buhl, Middelfart (DK)

(73) Assignee: ITW Construction Products ApS, Middelfart (DK)

(*) Notice: Subject to any disclaimer, the term of this patent is extended or adjusted under 35 U.S.C. 154(b) by 0 days.

(21) Appl. No.: 14/390,069

(22) PCT Filed: Apr. 2, 2013

(86) PCT No.: PCT/IB2013/052637
§ 371 (c)(1),
(2) Date: Oct. 2, 2014

(87) PCT Pub. No.: WO2013/150451
PCT Pub. Date: Oct. 10, 2013

(65) Prior Publication Data
US 2015/0063948 A1 Mar. 5, 2015

(30) Foreign Application Priority Data
Apr. 3, 2012 (DK) .................................. 2012 70172

(51) Int. Cl.
*F16B 35/06* (2006.01)
*F16B 23/00* (2006.01)
*B23G 9/00* (2006.01)

(52) U.S. Cl.
CPC .............. *F16B 23/003* (2013.01); *B23G 9/002* (2013.01)

(58) Field of Classification Search
CPC .... F16B 23/00; F16B 23/003; F16B 23/0038; F16B 23/0007; F16B 35/06

USPC .................................................. 411/402, 403
See application file for complete search history.

(56) References Cited

U.S. PATENT DOCUMENTS 2,777,353 A * 1/1957 Willis ........................... 411/403
2,969,250 A * 1/1961 Kull ............................... 403/350
(Continued)

FOREIGN PATENT DOCUMENTS

DE   102010029692 A1   12/2011
EP       1055828 A2    11/2000
(Continued)

OTHER PUBLICATIONS

ISR for PCT/IB2013/052637 mailed Aug. 13, 2013.
(Continued)

*Primary Examiner* — Roberta Delisle
(74) *Attorney, Agent, or Firm* — Hauptman Ham, LLP

(57) ABSTRACT

A fastener comprising a fastener body and a fastener head is disclosed. The fastener body has a threaded portion and defines a longitudinal axis. The fastener head is arranged at one end of the fastener body, and comprises a tool engaging portion. The tool engaging portion comprises a plurality of alternating lobes and flutes forming a multilobular surface pattern, each lobe having a driven surface arranged to engage with a driving surface of a tool, and a trailing surface arranged opposite to the driven surface. The driven surface and the trailing surface extend substantially parallel to the longitudinal axis defined by the fastener body. The trailing surface of at least one lobe is provided with a modified zone in which a diameter of the lobe is increased, said modified zone providing a wedging effect between the tool engaging portion and a tool.
In the fastener of the invention wobble between the fastener and a tool is significantly reduced. A tool for punching a recess in a fastener head is also disclosed.

14 Claims, 7 Drawing Sheets

(56) References Cited

U.S. PATENT DOCUMENTS

| | | | |
|---|---|---|---|
| 3,352,190 A * | 11/1967 | Carlson | 411/403 |
| 3,400,626 A * | 9/1968 | Bergere | 411/405 |
| 3,584,667 A * | 6/1971 | Reiland | 81/460 |
| 5,019,080 A * | 5/1991 | Hemer | 606/104 |
| 5,207,132 A * | 5/1993 | Goss et al. | 81/460 |
| 5,509,334 A | 4/1996 | Shinjo | 81/460 |
| 6,158,310 A | 12/2000 | Goss et al. | |
| 8,616,097 B2 | 12/2013 | Hughes et al. | |
| 2003/0044257 A1* | 3/2003 | Siegel et al. | 411/402 |
| 2004/0016324 A1* | 1/2004 | Wright | 81/121.1 |
| 2006/0078403 A1* | 4/2006 | Matzler et al. | 411/402 |
| 2006/0266168 A1* | 11/2006 | Pacheco | 81/460 |
| 2013/0068075 A1 | 3/2013 | Stiebitz et al. | |

FOREIGN PATENT DOCUMENTS

| | | |
|---|---|---|
| EP | 2363245 A2 | 9/2011 |
| GB | 1491515 A | 11/1977 |
| JP | 2004197908 A | 7/2004 |

OTHER PUBLICATIONS

Danish Search Report for PA 2012 70172 mailed Oct. 29, 2012.

* cited by examiner

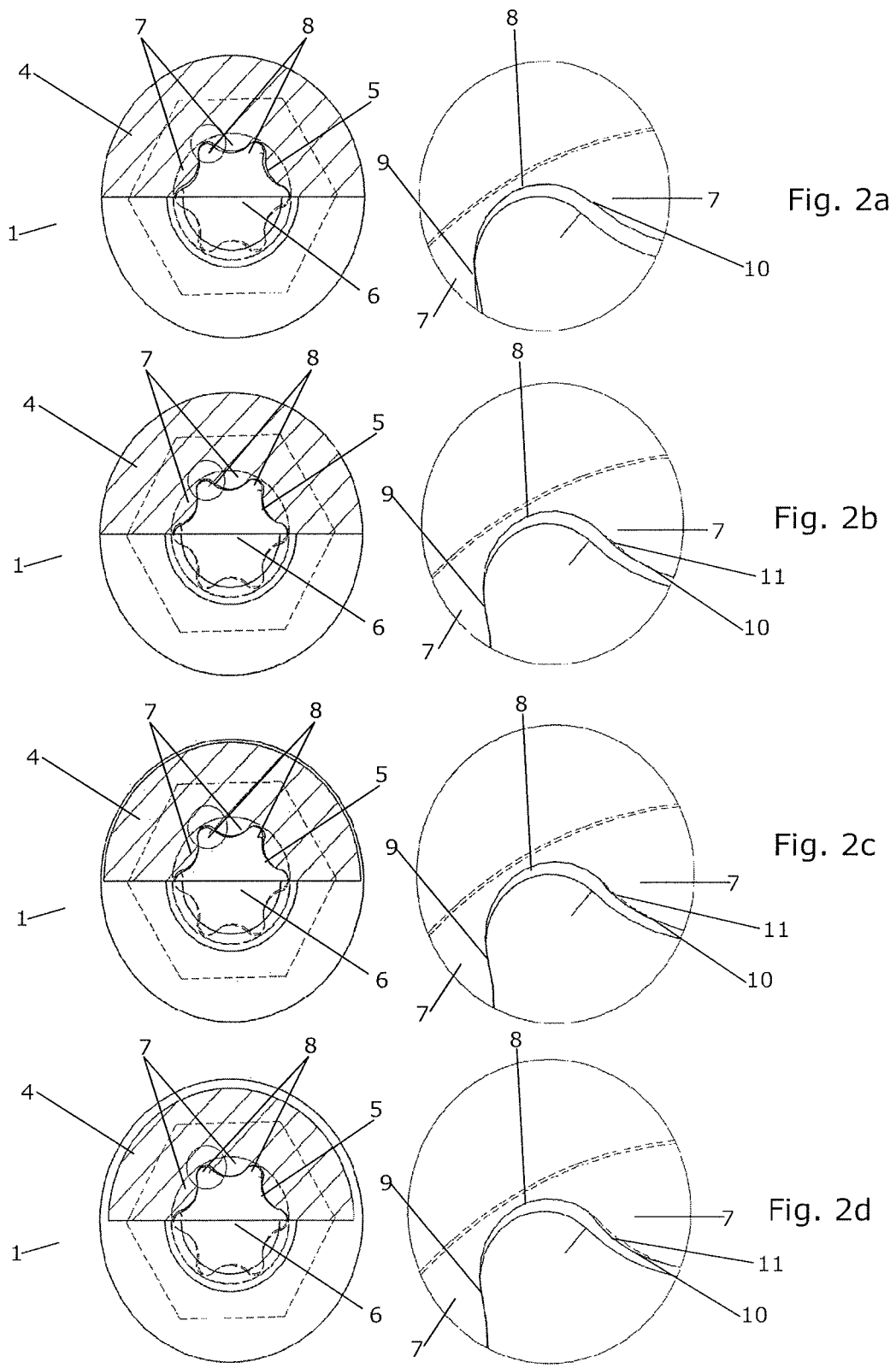

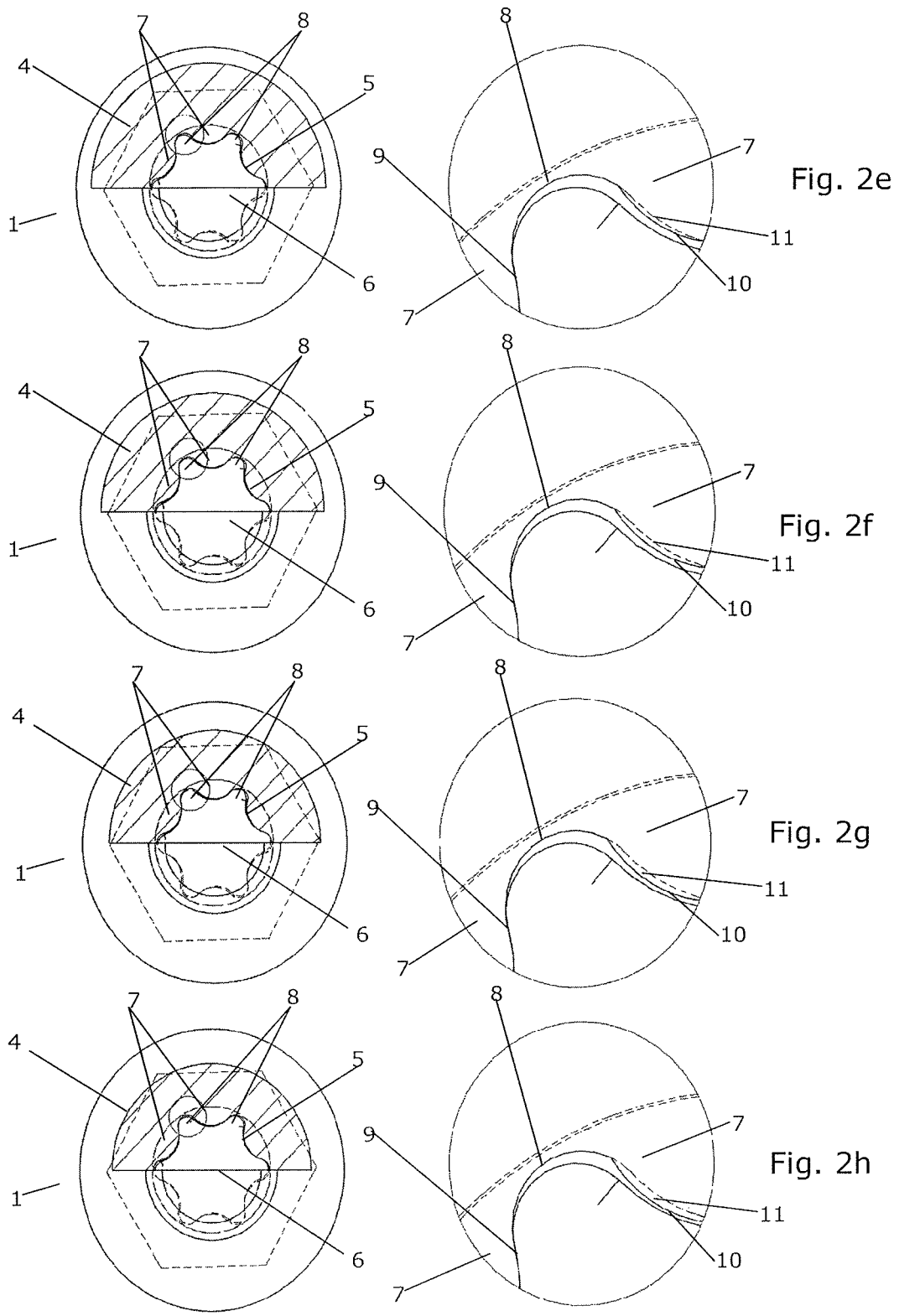

FASTENER WITH MULTILOBULAR TOOL ENGAGING PORTION

RELATED APPLICATIONS

The present application is a National Phase of International Application Number PCT/IB2013/052637 filed Apr. 2, 2013, which claims priority to Denmark Application Number PA 2012 70172 filed Apr. 3, 2012.

FIELD OF THE INVENTION

The present invention relates to a fastener of the kind which is adapted to be driven into a workpiece by means of a tool which engages a tool engaging portion, e.g. screws. The fastener of the invention comprises a tool engaging portion comprising a plurality of alternating lobes and flutes forming a multilobular surface pattern.

BACKGROUND OF THE INVENTION

Fasteners comprising a multilobular tool engaging portion are known. For instance, fasteners for use with a TORX® drive system are provided with such tool engaging portions. The tool engaging portion may be in the form of a socket formed in a fastener head, or it may be in the form of a protruding portion, extending outwardly from a fastener head. A multilobular tool engaging portion ensures that a good driving contact can be obtained between driving surfaces of a tool and driven surfaces of the tool engaging portion of the fastener, thereby ensuring efficient torque transfer between the tool and the fastener. Accordingly, the risk of the tool disengaging the fastener during driving the fastener into a workpiece is minimised.

However, in multilobular driving systems, the tool tends to 'wobble' or 'wander' when it engages a tool engaging portion of a fastener. Therefore it is often necessary to use two hands when the tool is operated. This is a disadvantage. Accordingly, it is desirable to provide a tighter fit between the tool and the fastener in order to prevent or reduce 'wobbling' of the tool during use, thereby allowing one-hand use of the tool.

U.S. Pat. No. 5,461,952 discloses a driver assembly for driving fasteners into a workpiece. According to one embodiment, a fastener socket is provided with a multilobular tool engaging portion where each lobe includes a driven side wall and a trailing tapered side wall. The driven side walls are adapted to contact the complementary lobular portions of a tool in order to apply torque to the fastener, while the trailing tapered side walls are aligned to contact the complementary lobular portion in wedge engagement. This reduces the wobble or walking of self-tapping screws.

One disadvantage of the driver assembly of U.S. Pat. No. 5,461,952 is that the trailing tapered side walls have the effect that the diameter of the socket increased along a direction from the base of the socket towards the mouth of the socket. Since it is desirable to ensure that the wedge engagement between the socket and the tool takes place at a certain depth of the socket, the mouth of the socket therefore has a relatively large diameter. This has the consequence that a relatively large gap exists between the socket and the tool at the mouth of the socket, and this increases the risk of instability or wobble of a tool engaging the socket of the fastener.

DESCRIPTION OF THE INVENTION

It is an object of embodiments of the invention to provide a multilobular fastener which is capable of reducing wobble during engagement with a standard multilobular tool.

It is a further object of embodiments of the invention to provide a multilobular fastener which provides a tighter engagement with a standard multilobular tool than prior art fasteners.

According to a first aspect the invention provides a fastener comprising:

a fastener body having a threaded portion, said fastener body defining a longitudinal axis, a fastener head arranged at one end of the fastener body, said fastener head comprising a tool engaging portion, wherein the tool engaging portion comprises a plurality of alternating lobes and flutes forming a multilobular surface pattern, each lobe having a driven surface arranged to engage with a driving surface of a tool, and a trailing surface arranged opposite to the driven surface, said driven surface and said trailing surface extending substantially parallel to the longitudinal axis defined by the fastener body, wherein the trailing surface of at least one lobe is provided with a modified zone in which a diameter of the lobe is increased, said modified zone providing a wedging effect between the tool engaging portion and a tool.

In the present context the term 'fastener' should be interpreted to mean an object which can be used for attaching two or more items to each other. The fastener of the present invention comprises a fastener body comprising a threaded portion. The threaded portion may be used for driving the fastener into a workpiece by means of a rotating movement. Thus, the fastener may advantageously be a screw, a bolt or the like.

The fastener body defines a longitudinal axis. Accordingly, the fastener body has an elongated shape, i.e. the fastener body is significantly larger along one dimension than along dimensions transversely thereto.

The fastener further comprises a fastener head arranged at one end of the fastener body. The fastener head comprises a tool engaging portion. The tool engaging portion is the part of the fastener which is adapted to engage with a suitable tool in such a manner that the fastener can be driven into a workpiece by means of the tool.

The tool engaging portion comprises a plurality of alternating lobes and flutes forming a multilobular surface pattern. The multilobular pattern may, e.g., be of the kind which is used in drive systems of the TORX® type.

Each lobe has a driven surface arranged to engage with a driving surface of a tool, and a trailing surface arranged opposite to the driven surface. When a tool is arranged in engagement with the tool engaging portion, the driving surfaces of the tool are positioned in engagement with the driven surfaces of the tool engaging portion, and when the tool is rotated, the driving surfaces push the driven surfaces of the tool engaging portion, thereby rotating the fastener and driving it into a workpiece.

The driven surface and the trailing surface extend substantially parallel to the longitudinal axis defined by the fastener body. Thereby the driven surface and the trailing surface also extend substantially parallel to each other. Accordingly, when a tool, having a surface with a size and shape which matches the size and shape of the multilobular surface of the tool engaging portion of the fastener, is arranged in engagement with the tool engaging portion of the fastener, a distance between the multilobular surface of the fastener and the multilobular surface of the tool remains substantially constant as the tool is positioned at the fastener. This allows for easy and accurate positioning of the tool.

Furthermore, arranging the driven surface substantially parallel to the longitudinal axis defined by the fastener body ensures that the torque transfer from the tool to the fastener is efficient, and cam out of the tool during operation is resisted.

However, the trailing edge of at least one of the lobes is provided with a modified zone in which the diameter of the lobe is increased. The increased diameter of the lobe in the region of the zone provides a wedging effect between the tool engaging portion of the fastener and a tool arranged in engagement with the fastener. This ensures that wobble between the tool and the fastener is significantly reduced, and one hand operation of the tool is possible.

Furthermore, since the increased diameter of the lobe(s) is only present in a region corresponding to the modified zone, a minimal distance between the tool and the tool engaging portion exists in the remaining part of the tool engaging portion. This even further reduces the risk of wobble between the tool and the fastener.

The tool engaging portion may be a socket formed in the fastener head, and the multilobular surface pattern may be formed on an inner surface of the socket. According to this embodiment, the fastener comprises a socket, while a tool adapted to engage with the tool engaging portion comprises a matching portion which can be inserted into the socket.

In this case, the modified zone may be arranged in a region at or near a base of the socket. Thereby the wedging effect between the tool engaging portion and the tool is provided at or near the base of the socket. Simultaneously, in the region near the mouth of the socket the trailing surfaces are not modified. This ensures that the tool can be easily inserted into the socket until the modified zone is encountered and the wedging effect occurs. Furthermore, as described above, the distance between the tool and the socket in the region near the mouth of the socket is minimal, because the driven surfaces as well as the trailing surfaces extend substantially parallel to the longitudinal axis defined by the fastener body in this region.

As an alternative, the tool engaging portion may be a protruding part extending outwardly from the fastener head, and the multilobular surface pattern may be formed on an outer surface of the protruding part. According to this embodiment, the tool is provided with a socket with an inner surface which matches the outer surface of the protruding part of the fastener.

In this case the modified zone may be arranged in a region of the protruding part which is arranged at or near an outer surface of the fastener head from which the protruding part extends. Thereby the wedging effect between the tool engaging portion and the tool is provided near the fastener head, i.e. near a base of the protruding part which forms the tool engaging portion of the fastener. Simultaneously, in the region near the free end of the protruding part the trailing surfaces are not modified. This ensures that the socket of a tool can easily be mounted in the protruding part until the modified zone is encountered and the wedging effect occurs. Furthermore, as described above, the distance between the tool and the protruding part in the region near the free end of the protruding part is minimal, because the driven surfaces as well as the trailing surfaces extend substantially parallel to the longitudinal axis defined by the fastener body in this region.

The multilobular surface pattern may be a hexlobular surface pattern. In this case the tool engaging portion comprises six lobes and six flutes. Such a tool engaging portion is, e.g. known from drive systems of the TORX® type. As an alternative, the tool engaging portion may comprise more or fewer lobes and flutes.

According to one embodiment, the trailing surface of each of the lobes may be provided with a modified zone. Thereby the wedging effect between the tool engaging portion and the tool is provided at each lobe, and thereby wobble between the tool and the fastener is efficiently reduced. As an alternative, a modified zone may be present on the trailing surface of only one of the lobes, or on the trailing surface of two or more of the lobes, but not all of the lobes. For instance, a modified zone may be present on every second or every third lobe. Other possibilities could also be envisaged.

The modified zone may define a tapered surface. According to this embodiment, a surface of the modified zone defines an angle with respect to the longitudinal axis defined by the fastener body, and thereby with respect to the driven surface, and with respect to the remaining part of the trailing surface. The tapered shape has the effect that the diameter of the lobe increases gradually along a direction of the longitudinal axis defined by the fastener body. This gradual increase in the diameter of the lobe provides the wedging effect. The angle defined by the tapered surface with respect to the longitudinal axis defined by the fastener body may be within the interval 0.5° to 3.5°, such as within the interval 1° to 3°, such as within the interval 1.2° to 2.5°, such as within the interval 1.5° to 2°, such as approximately 1.8° or approximately 1.9°.

As an alternative, the modified zone may define a curved surface. In this case the curved surface may advantageously define a substantially constant radius of curvature. The radius of curvature may be within the interval 5 mm to 30 mm, such as within the interval 7 mm to 28 mm, such as within the interval 10 mm to 25 mm, such as within the interval 12 mm to 22 mm, such as within the interval 14 mm to 20 mm, such as within the interval 15 mm to 18 mm, such as within the interval 16 mm to 17 mm. The radius of curvature depends on the size of the socket or protruding part, i.e. it depends on a representative diameter of the socket or protruding part, as well as a depth of the socket or protruding part. The curved surface may advantageously be arranged in such a manner that the diameter of the lobe increases along a direction of the longitudinal axis defined by the fastener body, similar to the situation described above. Providing a modified zone defining a curved surface is an advantage, because it provides a tighter fit between the tool and the fastener than a sloping or tapered surface. This is due to the fact that part of the curved surface will be arranged substantially parallel to the longitudinal axis defined by the fastener body.

In addition to the curved surface, the modified zone may comprise a portion which extends substantially parallel to the longitudinal axis defined by the fastener body, but with an increased diameter of the lobe. This even further increases the wedging effect and reduces wobble between the tool and the fastener.

The modified zone may extend towards a neighbouring driven surface. According to this embodiment, the modified zone is not restricted to the trailing surface. Instead, the modified zone may extend into a flute arranged between the trailing surface comprising the modified zone and a driven surface of a neighbouring lobe. Thereby the wedging effect is also provided along the flute.

According to a second aspect the invention provides a tool for punching multilobular recesses into fastener heads, said tool defining a longitudinal axis, said tool comprising an end portion being provided with a plurality of alternating lobes and flutes defining a multilobular surface pattern on an outer surface of the end portion, each lobe having a first surface and a second surface, said surfaces extending substantially parallel to the longitudinal axis defined by the tool, wherein the second surface of at least one lobe is provided with a modified zone in which a diameter of the lobe is reduced.

When the tool is used for punching a recess into a fastener head, the resulting recess comprises an inner surface which is provided with a multilobular surface pattern. The lobes of the tool will create flutes of the fastener, and flutes of the tool will create lobes of the fastener. Since the tool comprises at least one modified zone, which provides a lobe of a decreased diameter, the neighbouring flute has an increased diameter in the region corresponding to the modified zone. This flute will create a lobe of the fastener which has a modified zone along a trailing surface, said modified zone providing an increased diameter of the lobe. Accordingly, the resulting fastener is a fastener according to the first aspect of the invention.

It should be noted, that the present invention further relates to a similar tool, in which the end portion is provided with an inner multilobular surface pattern. In this case the resulting multilobular surface pattern of the fastener is an outer surface pattern.

The modified zone may be arranged in a region at or near a free end of the end part. According to this embodiment, the modified zone of the resulting fastener is arranged at or near a base of the socket, formed by the recess being punched by means of the tool.

The modified zone may define a tapered surface, or a curved surface. This has already been described above with reference to the first aspect of the invention.

BRIEF DESCRIPTION OF THE DRAWINGS

The invention will now be described in further detail with reference to the accompanying drawings in which FIGS. 2a-2j are cross sectional views of the fastener of FIG. 1, along the lines 'a' to 'j' illustrated in FIG. 1.

DETAILED DESCRIPTION OF THE DRAWINGS

Figure 1:
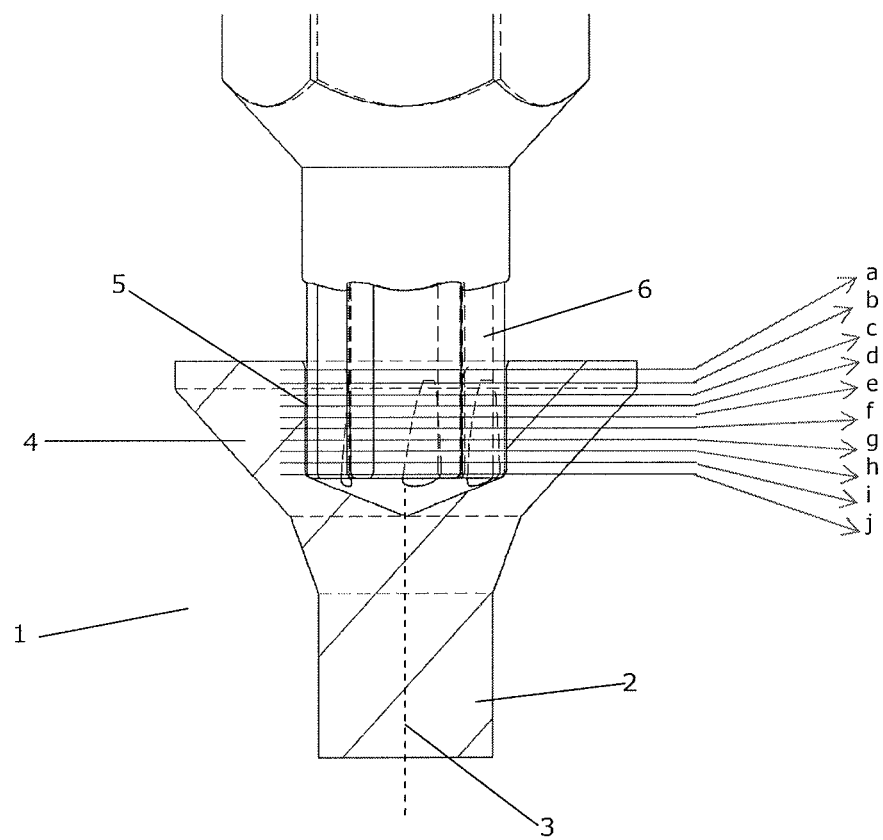
FIG. 1 is a side view of a fastener according to an embodiment of the invention, the fastener having a tool bit inserted in a socket thereof.

FIG. 1 is a perspective view of a fastener 1 according to an embodiment of the invention. The fastener 1 comprises a fastener body 2 comprising a threaded portion (not shown), and defining a longitudinal axis 3. The fastener 1 further comprises a fastener head 4 having a socket 5 formed therein. The socket 5 forms a tool engaging portion, i.e. it is adapted to receive a tool bit 6 being provided with an outer surface having a multilobular surface pattern which matches the multilobular surface pattern of the socket 5. FIG. 1 shows a tool bit 6 arranged in the socket 5 of the fastener 1.

FIGS. 2a-2j are cross sectional views of the fastener 1 of FIG. 1. The left side of each Figure shows the entire cross section of the fastener, and the right side of each Figure shows a detail of the cross section.

FIG. 2a is a cross sectional view of the fastener 1 of FIG. 1 along the line 'a' illustrated in FIG. 1. Thus, the cross section of FIG. 2a is close to the mouth of the socket 5.

The socket 5 comprises six lobes 7 and six flutes 8 arranged alternatingly along the socket 5, and forming a multilobular inner surface pattern in the socket 5. Each lobe 7 has a driven surface 9 and a trailing surface 10 arranged opposite the driven surface 9. It can be seen that driving surfaces of the tool bit 6 engage the driven surfaces 9 of the socket 5, thereby allowing the fastener 1 to be driven into a workpiece by means of the tool bit 6. The torque transmission between the tool bit 6 and the fastener 1 is very efficient, because the driven surface extends substantially parallel to the longitudinal axis 3 defined by the fastener body 2. In the region illustrated in FIG. 2a, the trailing surfaces 10 of the lobes 7 also extend substantially parallel to the longitudinal axis 3 defined by the fastener body 2. It can be seen that a small gap is therefore formed between the trailing surfaces 10 and the tool bit 6. This allows the tool bit 6 to be inserted into the socket 5.

FIG. 2b is a cross sectional view of the fastener 1 of FIG. 1, along the line 'b' illustrated in FIG. 1. Thus, the cross section of FIG. 2b is a bit further away from the mouth of the socket 5 than the cross section of FIG. 2a.

It can be seen that, in the region of the cross section of FIG. 2b, the trailing surface 10 is provided with a modified zone 11, in which the diameter of the lobe 7 is slightly increased.

FIGS. 2c-2j are cross sectional views of the fastener 1 of FIG. 1, along the lines 'c'-'j' illustrated in FIG. 1, respectively. Thus, these cross sections are increasingly further away from the mouth of the socket 5, and closer to the base of the socket 5.

Figure 2I:
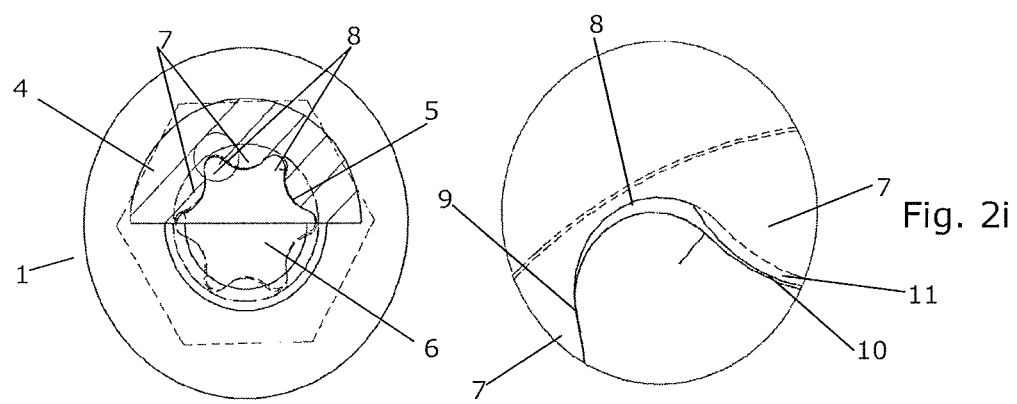
Figure 2J:
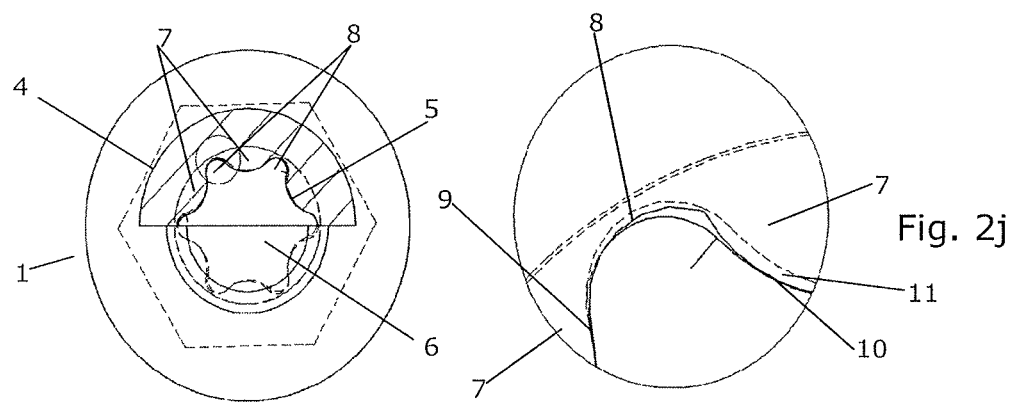

It is clear from FIGS. 2a-2j, that the closer to the base of the socket 5, and the further away from the mouth of the socket 5, the larger the increase in the diameter of the lobe 7 caused by the modified zone 11. In FIGS. 2i and 2j, it is clear that there is no longer a gap between the trailing surface 10 and the tool bit 6. Accordingly, the modified zone 11 provides a wedging effect between the socket 5 and the tool bit 6. Thereby wobble between the fastener 1 and the tool bit 6 is significantly reduced.

Figure 3:
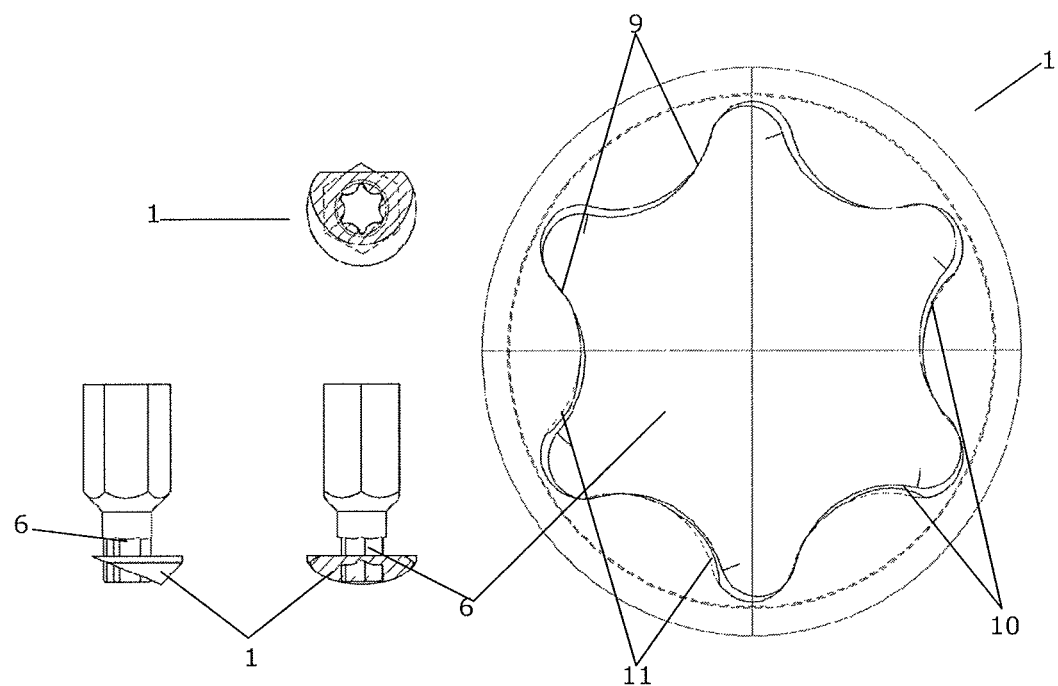
FIG. 3 illustrates an angled sectional view of the fastener of FIG. 1.

FIG. 3 illustrates an angled cross section of the fastener 1 of FIG. 1, illustrating essentially the same as illustrated by FIGS. 2a-2j, i.e. that the modified zone 11 of each trailing surface 10 provides a gradual increase in the diameter of the lobes 7, the closer to the base of the socket 5. This increased diameter provides the desired wedging effect.

Figure 4:
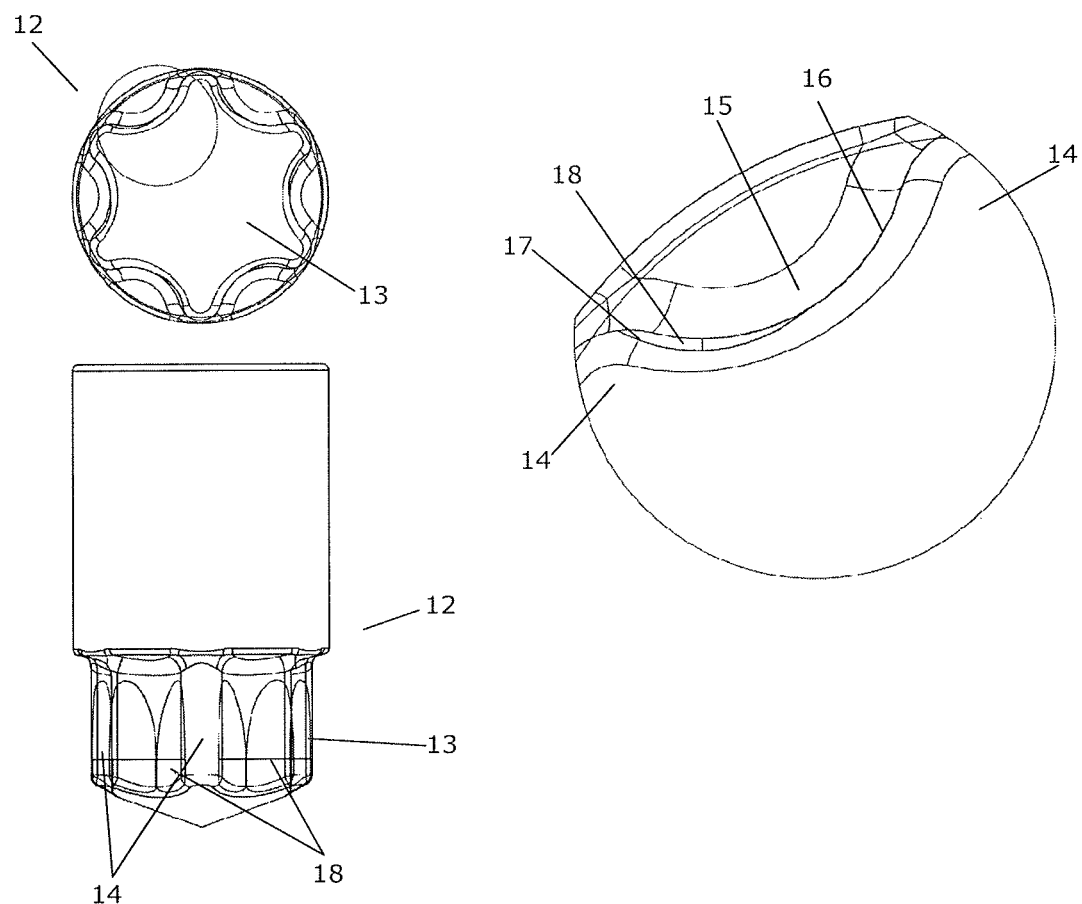
FIG. 4 illustrates a punching tool according to an embodiment of the invention.

FIG. 4 illustrates a punching tool 12 according to an embodiment of the invention. The upper left Figure shows an end view of the punching tool 12, the lower left Figure shows a side view of the punching tool 12, and the right Figure shows a detail of the end view of the punching tool 12.

The punching tool 12 comprises an end part 13 with a multilobular surface pattern of alternating lobes 14 and flutes 15, formed on an outer surface thereof. Each of the lobes 14 of the multilobular surface pattern is provided with a first surface 16 and a second surface 17. The second surface 17 comprises a modified zone 18, in which material has been removed. Thereby the diameter of the relevant lobe 14 is decreased in the region of the modified zone 18. The modified zone 18 of each lobe 14 is arranged near the free end of the end part 13 of the punching tool 12.

When the punching tool 12 is used for punching a socket in a fastener head, an inner surface with a multilobular surface pattern is provided in the socket. Due to the modified zones 18, corresponding modified zones are present in the socket. However, in these modified zones, the diameter of the lobes is increased. Furthermore, the modified zones of the socket are provided near a base of the socket. Accordingly, the resulting fastener is of the kind described above with reference to FIGS. 1-3, and a wedging effect is provided between the socket and a tool arranged in the socket.

Figure 5:
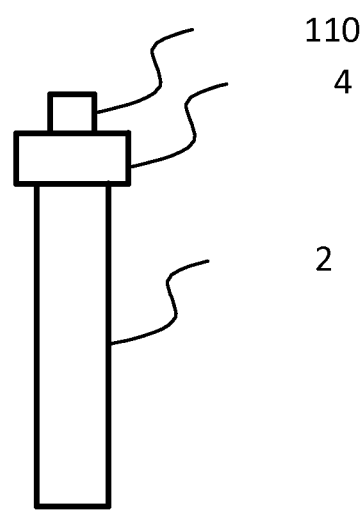
FIG. 5 is a side functional view of a fastener according to an embodiment of the invention.

FIG. 5 depicts, in functional black-box format, a fastener comprising a fastener body 2 with a fastener head 4 with a tool engaging portion 110 that is a protruding part extending outwardly from the fastener head 4.

The invention claimed is:

1. A fastener comprising:
   a fastener body having a threaded portion, said fastener body defining a longitudinal axis,
   a fastener head arranged at one end of the fastener body, said fastener head comprising a tool engaging portion, wherein the tool engaging portion comprises a plurality of alternating lobes and flutes forming a multilobular surface pattern, each lobe having a driven surface arranged to engage with a driving surface of a tool, and a trailing surface arranged opposite to the driven surface, said driven surface and said trailing surface extending substantially parallel to the longitudinal axis defined by the fastener body, wherein the trailing surface of at least one lobe is provided with a modified zone in which a diameter of the lobe is increased, said modified zone providing a wedging effect between the tool engaging portion and a tool.

2. A fastener according to claim 1, wherein the tool engaging portion is a socket formed in the fastener head, and wherein the multilobular surface pattern is formed on an inner surface of the socket.

3. A fastener according to claim 2, wherein the modified zone is arranged in a region at or near a base of the socket.

4. A fastener according to claim 1, wherein the tool engaging portion is a protruding part extending outwardly from the fastener head, and wherein the multilobular surface pattern is formed on an outer surface of the protruding part.

5. A fastener according to claim 4, wherein the modified zone is arranged in a region of the protruding part which is arranged at or near an outer surface of the fastener head from which the protruding part extends.

6. A fastener according to claim 1, wherein the multilobular surface pattern is a hexlobular surface pattern.

7. A fastener according to claim 1, wherein the trailing surface of each of the lobes is provided with a modified zone.

8. A fastener according to claim 1, wherein the modified zone defines a tapered surface.

9. A fastener according to claim 1, wherein the modified zone defines a curved surface.

10. A fastener according to claim 1, wherein the modified zone extends towards a neighbouring driven surface.

11. A tool for punching multilobular recesses into fastener heads, said tool defining a longitudinal axis, said tool comprising an end portion being provided with a plurality of alternating lobes and flutes defining a multilobular surface pattern on an outer surface of the end portion, each lobe having a first surface and a second surface, said surfaces extending substantially parallel to the longitudinal axis defined by the tool, wherein the second surface of at least one lobe is provided with a modified zone in which a diameter of the lobe is reduced.

12. A tool according to claim 11, wherein the modified zone is arranged in a region at or near a free end of the end part.

13. A tool according to claim 11, wherein the modified zone defines a tapered surface.

14. A tool according to claim 11, wherein the modified zone defines a curved surface.

* * * * *